(12) United States Patent
Xu et al.

(10) Patent No.: US 8,798,472 B2
(45) Date of Patent: Aug. 5, 2014

(54) AGILE LIGHT SOURCE PROVISIONING FOR INFORMATION AND COMMUNICATIONS TECHNOLOGY SYSTEMS

(75) Inventors: Qing Xu, Montreal (CA); Robert Brunner, Montreal (CA); Stephane Lessard, Mirabel (CA)

(73) Assignee: Telefonaktiebolaget L M Ericsson, Stockholm (SE)

( * ) Notice: Subject to any disclaimer, the term of this patent is extended or adjusted under 35 U.S.C. 154(b) by 198 days.

(21) Appl. No.: 13/545,193

(22) Filed: Jul. 10, 2012

(65) Prior Publication Data

US 2014/0016946 A1    Jan. 16, 2014

(51) Int. Cl.
*H04B 10/00*    (2013.01)

(52) U.S. Cl.
USPC ............................................. 398/82; 398/91

(58) Field of Classification Search
CPC ..................................................... H04B 10/506
USPC ...................................................... 398/82, 91
See application file for complete search history.

(56) References Cited

U.S. PATENT DOCUMENTS

| | | |
|---|---|---|
| 6,681,083 B1 | 1/2004 | Koonen |
| 2006/0051015 A1 | 3/2006 | Look |
| 2008/0095539 A1 | 4/2008 | Khalouf et al. |
| 2008/0101801 A1 | 5/2008 | Khalouf et al. |

*Primary Examiner* — Leslie Pascal
(74) *Attorney, Agent, or Firm* — Murphy, Bilak & Homiller, PLLC

(57) ABSTRACT

A chassis includes a plurality of continuous wave lasers each operable to emit a continuous wave optical beam at the same power as the other lasers, and a plurality of optical couplers operable to input the continuous wave optical beams of the same power and output a plurality of continuous wave optical beams at different powers. The chassis further includes a plurality of optical assemblies operable to modulate the continuous wave optical beams of different powers into a plurality of modulated optical signals at different powers and couple the modulated optical signals onto different length optical mediums so that lower power ones of the modulated optical signals are coupled to shorter ones of the optical mediums and higher power ones of the modulated optical signals are coupled to longer ones of the optical mediums.

21 Claims, 6 Drawing Sheets

AGILE LIGHT SOURCE PROVISIONING FOR INFORMATION AND COMMUNICATIONS TECHNOLOGY SYSTEMS

TECHNICAL FIELD

The present invention generally relates to information and communications technology systems, and more particularly relates to agile light source provisioning for information and communications technology systems.

BACKGROUND

Chassis for conventional information and communications technology (ICT) systems include linecards which typically have separate modules enabled by an optical interface. The modules can be optically interconnected to establish an ultra-high speed data exchange link. Light source provisioning for the optical channels on a linecard is enabled by external laser arrays via an optical frontplate. The frontplate is equipped with optical I/O (input/output) ports for aggregated optical channels. Each linecard is inserted into an electrical backplane to access the backplane low-speed control unit, power management and power supply. High speed data transmission is enabled via the optical frontplate. The optical I/O channels from the frontplate can be connected, via a fiber cable, to another linecard in the same chassis, or connected to an optical cross connect (OXC) unit in the chassis. Additional ports in the OXC units can establish inter-chassis optical interconnects. Based on the system link requirements, the optical I/O channels should be designed to interconnect at various hierarchy levels such as module to module on the same linecard, linecard to linecard in the same chassis, linecard to OXC (optical cross-connect unit) to linecard in the same chassis, and chassis to chassis. The reach range can vary from millimeter (mm) to kilometer (km).

With regard to system cost, power consumption and scalability consideration, the use of optical amplifiers in such systems is preferably minimized. Consequently, the optical link power budget is a factor that depends on each specific interconnection requirement, which is typically limited by fiber and waveguide propagation loss, photonics device insertion losses such as couplers and modulators, as well as additional losses in intermediate routers and switches. Typically, a longer reach link with more photonics devices has higher optical loss and requires a higher link budget.

Silicon photonics based optical interconnects offer various advantages for ICT systems. However, thermal issues on high density linecards are a major concern for the monolithic integration of electronics and photonics. From a system deployment and maintenance perspective, efficient equipment installation procedure, device replacement and redundancy requirements favor external laser arrays as the light source provision solution. Furthermore, due to propagation and insertion loss induced by the optical fibers, waveguides, and other passive and active photonics devices, the optical link budget for different types of interconnects can vary from 0 to 30 dB. It is neither necessary nor cost effective to use excessive high power light sources for very short links. On the other hand, the minimum power budget should be met for each link. It is preferable to use standard integrated laser arrays for diverse optical interconnects scenarios to achieve a power efficient and cost effective solution. Therefore a reach-adaptive light provision solution is desirable which uses standard integrated laser arrays in ICT systems.

SUMMARY

Embodiments described herein provide an efficient light source distribution scheme that intelligently adjusts the individual optical channel power provision for ICT systems based on interconnect range and scale. To this end, variable ratio optical couplers are used in an agile light source provision power splitter. The coupling ratio of each optical coupler can be varied by changing the refractive index of the coupling area, or by changing the effective coupling length or gap between adjacent coupling fibers or waveguides. According to the link budget requirements of each channel, a corresponding amount of optical power can be distributed from the external laser source. The laser arrays can be used for light source provision in a variety of interconnects link scenarios.

According to an embodiment of a chassis, the chassis comprises a plurality of continuous wave lasers each operable to emit a continuous wave optical beam at the same power as the other lasers and a plurality of optical couplers operable to input the continuous wave optical beams of the same power and output a plurality of continuous wave optical beams at different powers. The chassis further comprises a plurality of optical assemblies operable to modulate the continuous wave optical beams of different powers into a plurality of modulated optical signals at different powers and couple the modulated optical signals onto different length optical mediums so that lower power ones of the modulated optical signals are coupled to shorter ones of the optical mediums and higher power ones of the modulated optical signals are coupled to longer ones of the optical mediums.

According to an embodiment of a method of optical communication via a chassis including a plurality of continuous wave lasers, a plurality of optical couplers, and a plurality of optical assemblies, the method comprises: generating a plurality of continuous wave optical beams at the same power via the continuous wave lasers; generating a plurality of continuous wave optical beams at different powers from the continuous wave optical beams of the same power via the optical couplers; modulating the continuous wave optical beams of different powers into a plurality of modulated optical signals at different powers via the optical assemblies; and coupling the modulated optical signals onto different length optical mediums via the optical assemblies so that lower power ones of the modulated optical signals are coupled to shorter ones of the optical mediums and higher power ones of the modulated optical signals are coupled to longer ones of the optical mediums.

Those skilled in the art will recognize additional features and advantages upon reading the following detailed description, and upon viewing the accompanying drawings.

BRIEF DESCRIPTION OF THE DRAWINGS

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Figure 1:
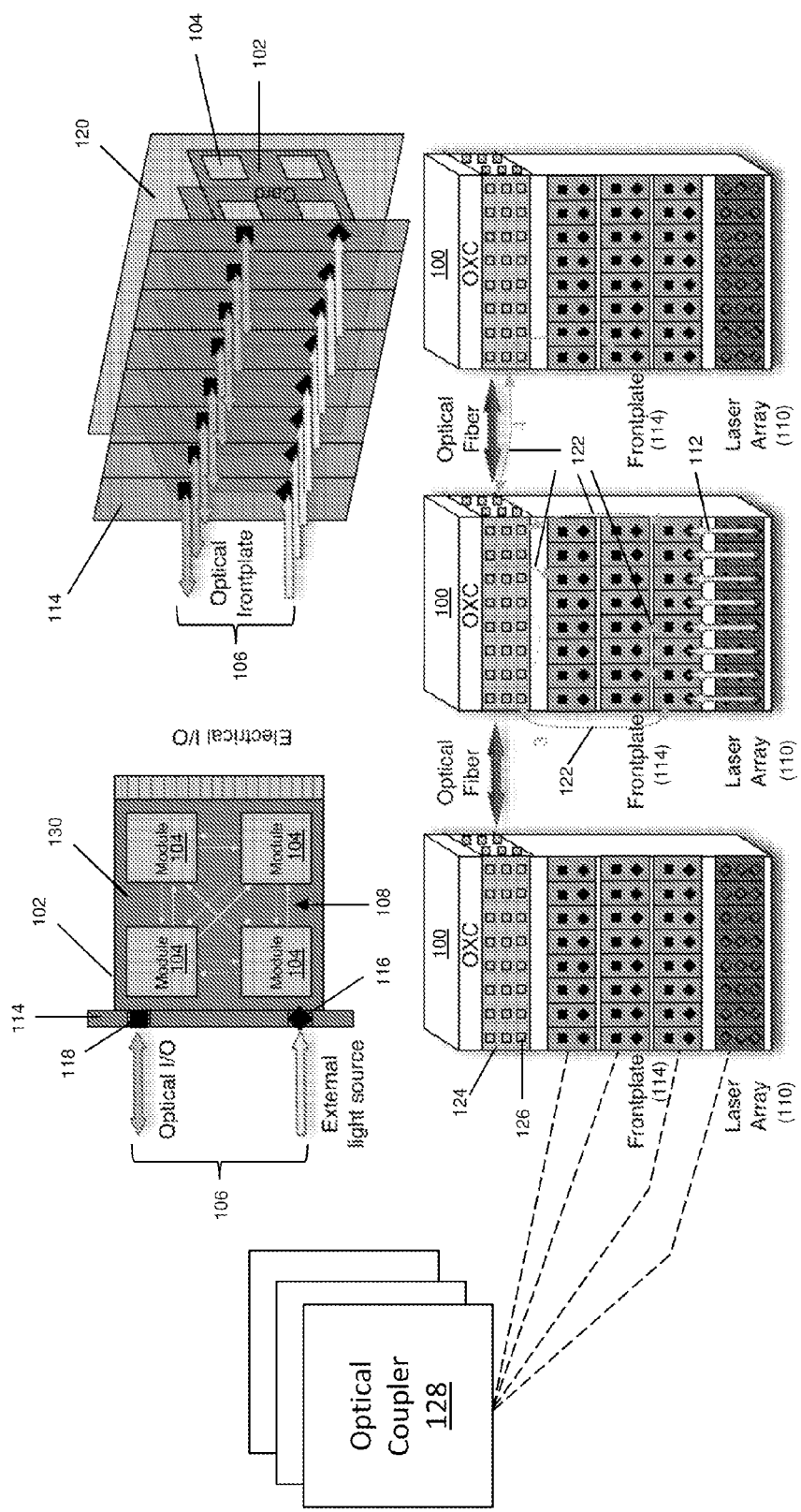
FIG. 1 is a diagram of an embodiment of a chassis which provides efficient light source distribution in an ICT system.

As a non-limiting example, FIG. 1 illustrates an embodiment of chassis 100 for use in ITC systems. The chassis 100 includes linecards 102 which have separate modules 104 enabled by an optical interface 106. The modules 104 can be optically interconnected to establish an ultra-high speed data exchange link. Light source provisioning for the optical channels 108 on a linecard 102 is enabled by laser arrays 110 included in the chassis 100. The laser arrays 110 include a plurality of continuous wave (CW) lasers each operable to emit a continuous wave optical beam 112 at the same power as the other lasers (Step 200, FIG. 2). Each linecard 102 has an optical frontplate 114 which is equipped with optical I/O (input/output) ports 116, 118 for aggregated optical channels. Each linecard 102 is inserted into an electrical backplane 120 to access a backplane low-speed control unit, power management and power supply (not shown). High speed data transmission is enabled via the optical frontplate 114. The optical I/O channels from the frontplate 114 can be connected, via a fiber cable 122, to another linecard 102 in the same chassis 100, or connected to an optical cross connect (OXC) unit 124 in the chassis 100. Some ports 126 in the OXC units 124 can also establish inter-chassis optical interconnects. The optical I/O channels of the chassis 100 can interconnect at various hierarchy levels such as module to module on the same linecard 102, linecard to linecard in the same chassis 100, linecard to OXC unit to linecard in the same chassis 100, and chassis to chassis.

The chassis 100 has an efficient light source distribution scheme that intelligently adjusts the individual optical channel power provision based on interconnect range and scale. To this end, the chassis 100 includes a plurality of optical couplers 128 which function as agile light source provision power splitters. The optical couplers 128 can be part of or integrated with the laser arrays 110 or the linecards 102 as indicated by the dashed lines in FIG. 1, or as separate components. That is, the optical couplers 128 can be part of the laser array complex 110 or part of the linecards 102 e.g. monolithically integrated into an optical module 104 of the linecard 102 or as a separate optical component of the linecard 102.

Figure 2:
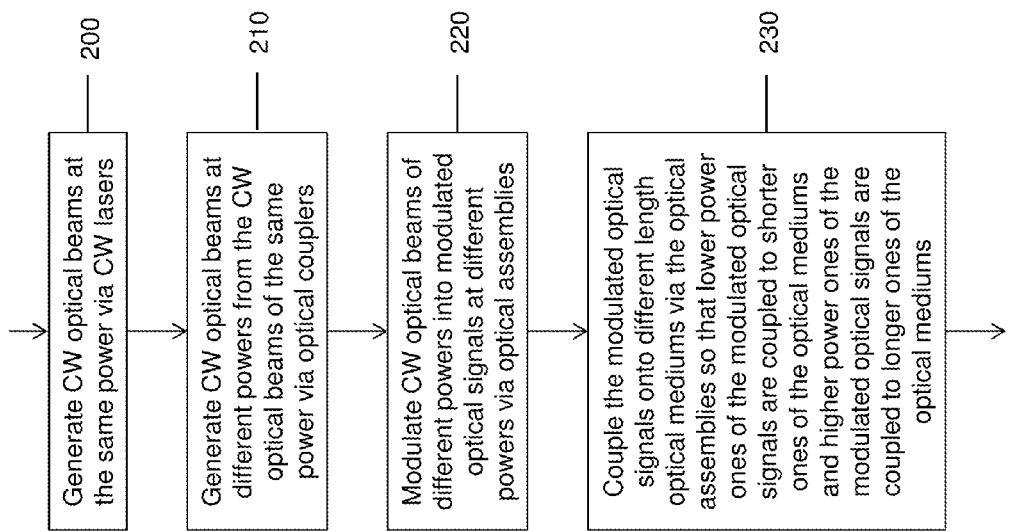
FIG. 2 is a flow diagram of an embodiment of a method of efficient light source distribution in an ICT system.

In each case, the optical couplers 128 input a plurality of CW optical beams 112 of the same power from a group of the CW lasers and output (generate) a plurality of CW optical beams at different powers (Step 210, FIG. 2). The different power CW optical beams generated by the optical couplers 128 can be carried to the linecards 102 via optical fibers 122 if the optical couplers 128 are included in the laser array complex 110. Alternatively, waveguides 108 can be provided on the linecards 102 for carrying the different power CW optical beams output by the optical couplers 128 to different optical modules 104 on the linecard 102 if the optical couplers 128 are provided on the linecards 102. In yet another embodiment, the optical couplers 128 can be housed in a different part of the chassis 100 than the laser arrays 110 and the linecards 102.

The linecards 102 are a type of optical assembly each including a plurality of optical modules 104 disposed on a card 130. At least one of the optical modules 104 on each card 130 modulates the CW optical beams of different powers output by a corresponding one of the optical couplers 128 into a plurality of modulated optical signals at different powers (Step 220, FIG. 2). The same or different optical module 104 couples the modulated optical signals onto different length optical mediums so that the optical assembly can couple lower power ones of the modulated optical signals to shorter ones of the optical mediums and couple higher power ones of the modulated optical signals to longer ones of the optical mediums (Step 230, FIG. 2).

For example, one of the optical modules 104 can modulate a lower power one of the CW optical beams from the corresponding optical coupler 128 into a modulated optical signal at the same lower power as the CW optical beam and couple that modulated lower power optical signal onto a waveguide 108 which connects the optical module 104 to another optical module 104 on the same card 130. This way, short reach module-to-module optical communications is supported on the same card 130 according to this embodiment. In another example, one of the optical modules 104 can modulate a higher power one of the CW optical beams from the corresponding optical coupler 128 into a modulated optical signal at the same higher power and couple that modulated higher power optical signal onto an external optical fiber 122 connected to the linecard 102. The higher power modulated optical signal can be of an intermediate power so that intermediate reach linecard-to-linecard optical communications (e.g. via an OXC unit 124) is supported according to this embodiment. The higher power modulated optical signal can be of an even higher power so that long reach chassis-to-chassis optical communications (which can be geographically distributed) is also supported.

In each case, the optical couplers 128 convert between CW optical beams of the same power generated by the CW lasers included in the laser arrays 110 to CW optical beams of different power so that the optical assemblies such as the linecards 102 included in the same chassis 100 can modulate CW optical beams of different power and couple the modulated optical signals onto different length optical mediums 108, 122 based on power level. For example, lower power modulated optical signals can be coupled to waveguides 108 on an optical linecard 102 and higher power modulated optical signals can be coupled to longer reach optical fibers 122 (e.g. tens to several hundreds of meters or even kilometers in length).

Figure 3:
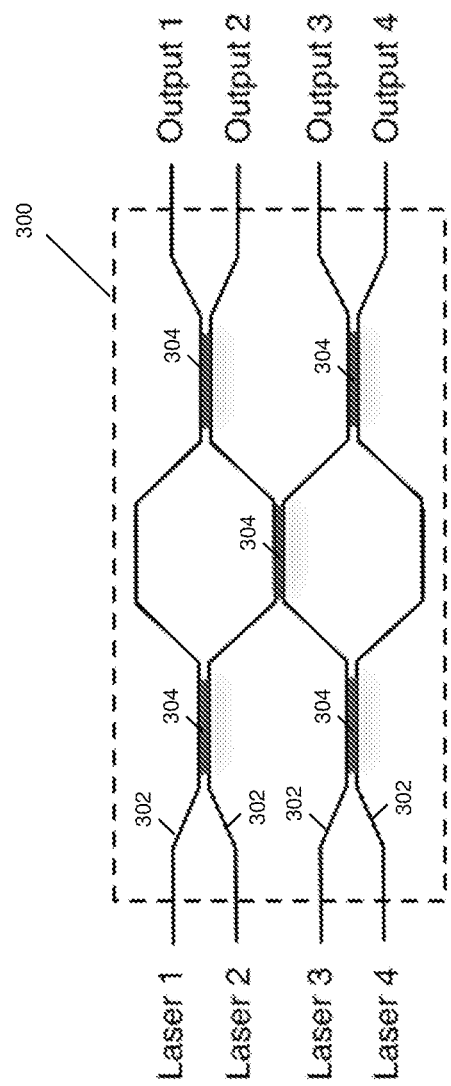
FIG. 3 is a diagram of an embodiment of an optical coupler included in a chassis which provides efficient light source distribution in an ICT system.

FIG. 3 illustrates an embodiment of the optical coupler 128 used in the chassis 100. According to this embodiment, the optical coupler 128 is a variable 4×4 optical power splitter module 300. The variable optical power splitter 300 is a Mach-Zehnder interferometer in one embodiment. In another embodiment, the variable optical power splitter 300 is a directional coupler or a multi-mode interference coupler. The variable optical power splitter 300 can be realized with different technologies, including variable transmittance/reflectance film, variable fiber coupling length, acousto-optics, Mach-Zehnder interferometer based technology, etc.

In each case, up to four CW laser input sources (Laser 1, . . . , Laser 4) can be used to power the four individual optical channels 302 of the variable 4×4 optical power splitter 300. According to the designated reach and link budget of a given output channel (Output 1, . . . , Output 4), a corresponding amount of optical power can be distributed so that the modulated signal can reach the designated photo-receiver at the other end with enough power, i.e. above the sensitivity of the photo-receiver with an acceptable margin, such as 2 to 3 dB as an example.

For instance, when only intra-module data communication is required (i.e. the minimum link budget), only one of the four CW laser input sources is needed to feed all four channels of the variable 4×4 optical power splitter 300. Consequently the other three CW laser units can be deactivated, or reserved for redundancy/replacement, or disconnected. In another scenario when inter-chassis data communication link is established, all four CW laser input sources are used to feed each individual optical channel 302 of the 4×4 splitter 300.

Figure 4A:
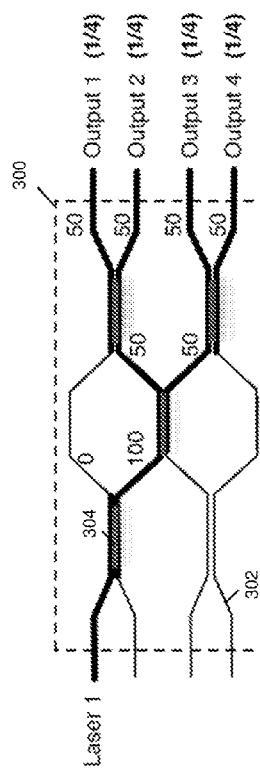
FIGS. 4A through 4D illustrate various embodiments of power splitting configurations for an optical coupler included in a chassis which provides efficient light source distribution in an ICT system.
Figure 4B:
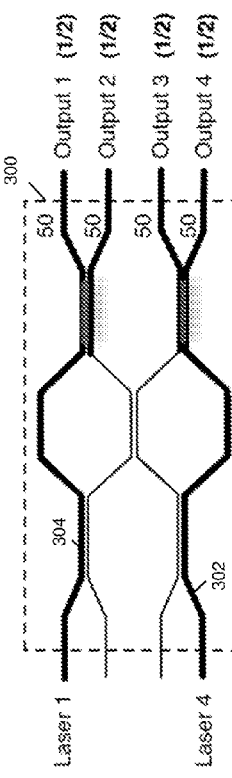
Figure 4C:
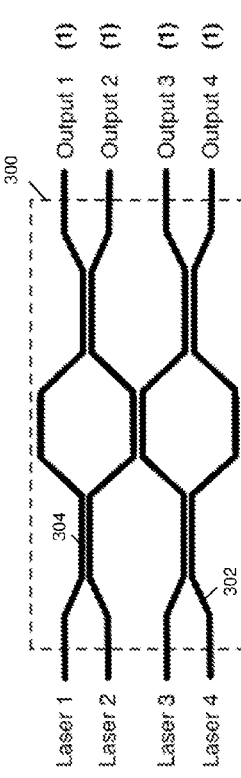
Figure 4D:
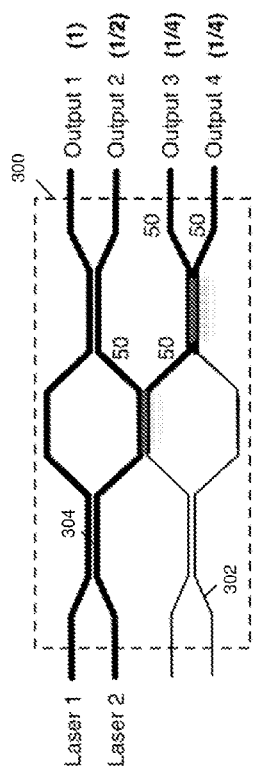

FIGS. 4A through 4D show different power splitting configurations for the variable 4×4 optical power splitter 300. In FIG. 4A, a single CW optical beam from one of the CW lasers (Laser 1) is input to the 4×4 optical splitter 300. The optical splitter 300 outputs four CW optical beams (Output 1, ..., Output 4) at a quarter (¼) of the input power. In FIGS. 4B through 4D, at least two CW optical beams of the same power from one of the laser arrays 110 is input to the 4×4 optical splitter 300 and the splitter 300 outputs the same number of CW optical beams as input at the same power as input, or fewer CW optical beams as input at a lower power than input. For example, in FIG. 4B two CW optical beams (Laser 1 and Laser 4) of the same power are input to the 4×4 optical splitter 300 and the splitter 300 outputs four CW optical beams (Output 1, ..., Output 4) each at half (½) the input power. In FIG. 4C, four CW optical beams (Laser 1, ..., Laser 4) of the same power are input to the 4×4 optical splitter 300 and the splitter 300 outputs four CW optical beams (Output 1, ..., Output 4) each at the input power. In FIG. 4D, two CW optical beams (Laser 1 and Laser 2) of the same power are input to the 4×4 optical splitter 300 and the splitter 300 outputs four CW optical beams. Two of the optical outputs (Output 3 and Output 4) are at a quarter (¼) of the input power, a third one (Output 2) is at half (½) the input power and the fourth output (Output 1) is at the full input power.

The variable 4×4 optical power splitter 300 has different coupling regions 304 which affect the amount of coupling between adjacent waveguides 302 of the splitter 300. The amount of coupling provided by each coupling region 304 determines how the input power is split between the different output channels. The coupling ratio of each coupling region 304 can be varied from 0% to 100% to achieve the desired output channel power levels. The coupling ratio (e.g. 100%, 50%, etc.) is shown in FIGS. 4A through 4D after each coupling region 304. The CW laser sources 110 can be presumed to be homogeneous and have the same fixed optical power, normalized to unit. Accordingly, the power distributed to each output port (Output 1, ..., Output 4) of the 4×4 splitter 300 can vary from 0 to 1 (0 meaning no power, and 1 meaning full laser power). Based on the link budget requirements of each individual channel, an appropriate power allocation (between 0 and 1) can be distributed by the agile power splitter 300.

In other embodiments, a variable 2×2 optical power splitter with two waveguides (up to 2 inputs and 2 outputs) is used instead of or in addition to a variable 4×4 optical power splitter with four waveguides (up to 4 inputs and 4 outputs). A variable 2×2 optical coupler module can be realized by a directional coupler or a multi-mode interference (MMI) type coupler, with a fused/taper optical fiber, or an integrated optical waveguide. The refractive index of the fiber/waveguide, the coupling length, and/or the gap between the two waveguides/fibers can be altered to change the coupling ratio between the two outputs, thereby changing the optical output power of the respective channels.

Figure 5:
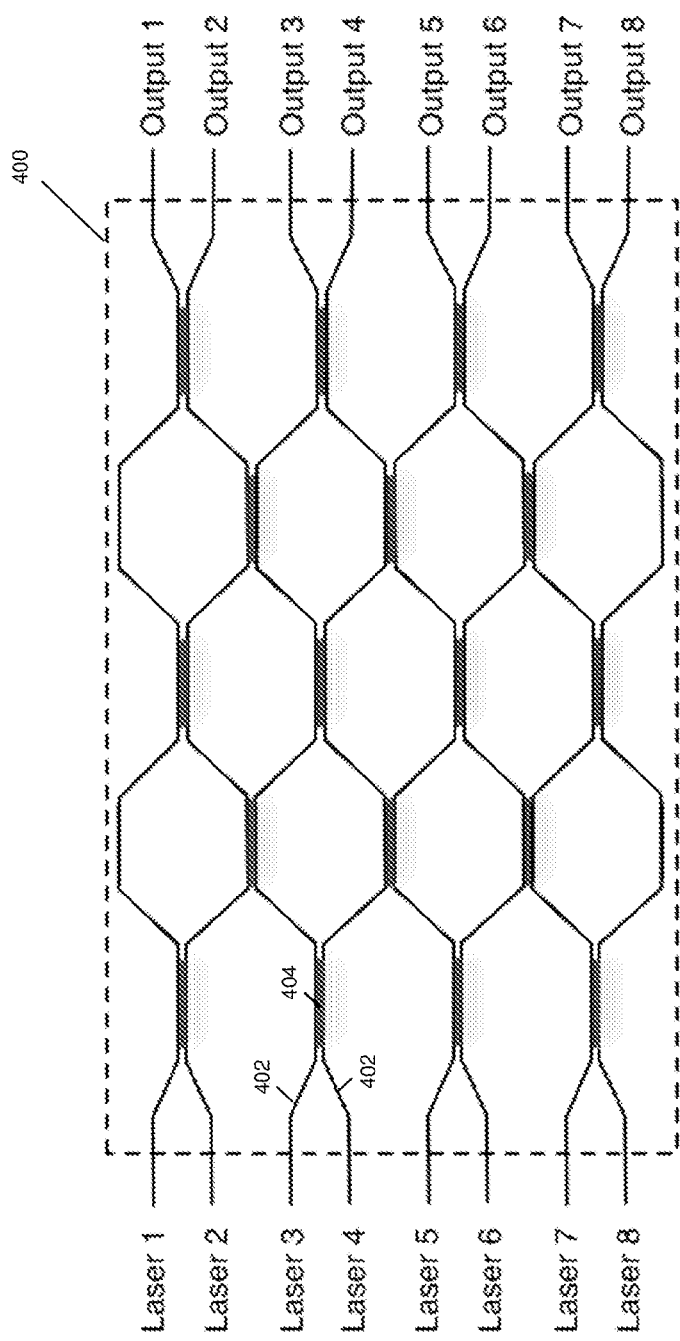
FIG. 5 is a diagram of another embodiment of an optical coupler included in a chassis which provides efficient light source distribution in an ICT system.

FIG. 5 illustrates another embodiment of the optical coupler 128 used in the chassis 100. According to this embodiment, the optical coupler 128 is a variable 8×8 optical power splitter 400. This embodiment is similar to the embodiment shown in FIG. 3, however the splitter 400 has eight waveguides 402 for receiving up to eight CW optical beams (Laser 1, ..., Laser 8) of the same power from one of the laser arrays 110 and outputting the same number of CW optical beams as input at the same power as input, or fewer CW optical beams as input at a lower power than input. The variable 8×8 optical power splitter 400 has different coupling regions 404 which affect the amount of coupling between adjacent waveguides 402 of the splitter 400. The amount of coupling provided by each coupling region 404 determines how the input power is split between the different output channels. The coupling ratio of each coupling region 404 can be varied from 0% to 100% to achieve the desired output channel power levels as previously described herein. In some embodiments, the amount of coupling can be programmable and reconfigurable as described in more detail next.

FIGS. 6A through 6D illustrate different embodiments of two adjacent waveguides 500 included in an n×n variable optical power splitter. In one embodiment, the waveguides 500 are disposed on a semiconductor substrate. In general, one or more coupling regions are provided between the adjacent waveguides 500 over the length of the waveguides 500. The amount of coupling provided by each coupling region can be programmed or reconfigured to adjust the power of the CW optical beams carried by the waveguides 500. In one embodiment, the refractive index of the waveguides 500, a coupling length (Lc) of the waveguides 500 and/or a coupling gap (g) between the waveguides 500 is modifiable so that the power coupling ratio between outputs of the n×n optical power splitter can be changed.

Figure 6A:
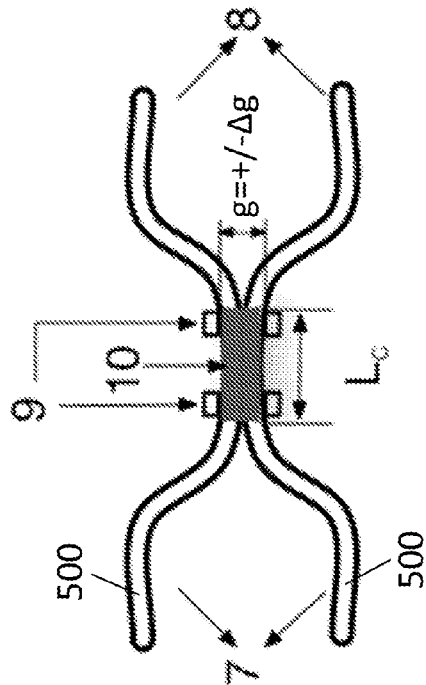
FIGS. 6A through 6D illustrate various embodiments of waveguide coupling configurations for an optical coupler included in a chassis which provides efficient light source distribution in an ICT system.

FIG. 6A illustrates an embodiment of a fiber thermo-optical variable directional coupler. Thin films of metal alloy 4, 5 are deposited on the waveguides 500. As current from an external power supply 3 passes through either of the upper or lower metal alloys 4, 5, the ally 4, 5 heats up the coupling region 6 and consequently increases the refractive index in this area. The coupling region 6 also has an effective coupling length Lc. The coupling coefficient K is a function of the relative index difference between the claddings of the waveguides 500 and the surrounding medium (e.g. air). A change of K results in a desired coupling ratio between the input ports 1 and the output ports 2.

Figure 6B:
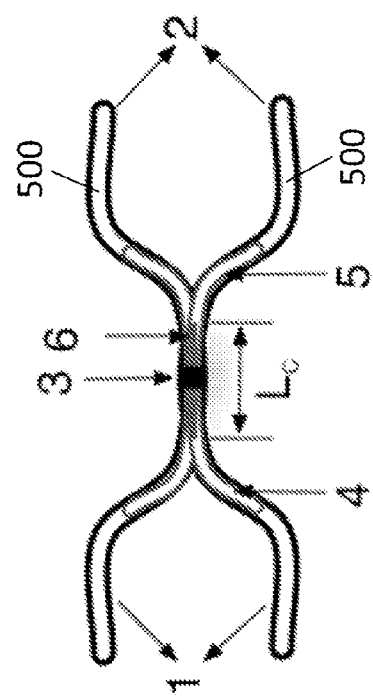

FIG. 6B illustrates another embodiment of a variable directional coupler. According to this embodiment, the coupling ratio can be altered mechanically. One or more micro-actuators 9 are provided in the coupling region 10 to change the gap (g) between the adjacent waveguides 500. The coupling coefficient K changes as a function of the gap g+/−g where +/−Δg is the amount of change in the gap g imparted by the micro-actuators 9, resulting in a desired coupling ratio between the input ports 7 and the output ports 8.

Figure 6C:
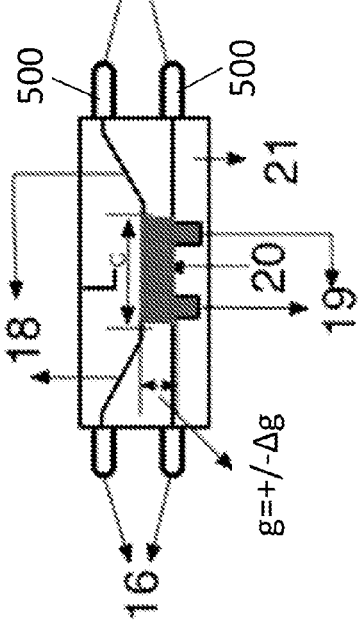

FIG. 6C illustrates an embodiment of a silicon hybrid waveguide multimode interference coupler. The coupler launches CW light into a symmetric multi-mode (MM) waveguide 13 with metal contacts 14 deposited on top. The symmetric MM waveguide 13 is disposed on a silicon substrate 15. This allows for applying a current bias on different sections via the metal contacts 14, exploiting the carrier related plasma effects that lead to a negative refractive index change in the symmetric MM waveguide 13. Other approaches such as temperature-related refractive index change can also be used as an alternative to obtain a positive index change, resulting in a desired coupling ratio between the input ports 11 and the output ports 12.

Figure 6D:
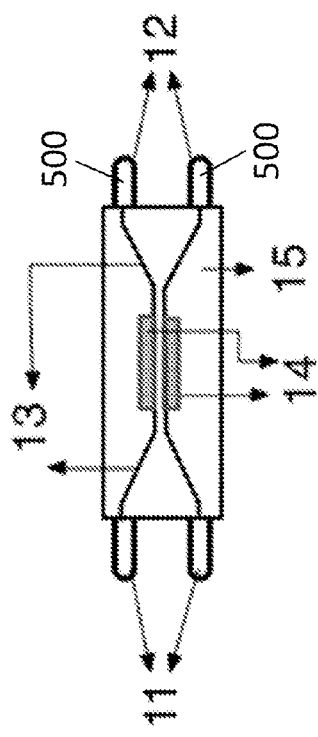

FIG. 6D illustrates an embodiment of a silicon waveguide variable coupler 18 based on a gap-variable mechanism. The gap (g) between the adjacent waveguides 500 developed on a silicon substrate 21 can be changed with one or more electrostatic micro-actuators 19 to control the coupling ratio, because the coupling coefficient K changes as a function of the gap g+/−Δg between the two waveguides 500 in the coupling area 20. External comb drivers can be used to change the voltage applied to the micro-actuator(s) 19, resulting in a desired coupling ratio between the input ports 16 and the output ports 17. A silicon CMOS (complementary metal oxide semiconductor) photonics compatible variable optical coupler technology can be used for monolithic integration in large scale ICT systems, as these types of couplers can be manufactured with a very compact sub-millimeter dimension.

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A chassis, comprising:
   a plurality of continuous wave lasers each operable to emit a continuous wave optical beam at the same power as the other lasers;
   a plurality of optical couplers operable to input the continuous wave optical beams of the same power and output a plurality of continuous wave optical beams at different powers; and
   a plurality of optical assemblies operable to modulate the continuous wave optical beams of different powers into a plurality of modulated optical signals at different powers and couple the modulated optical signals onto different length optical mediums so that lower power ones of the modulated optical signals are coupled to shorter ones of the optical mediums and higher power ones of the modulated optical signals are coupled to longer ones of the optical mediums.

2. The chassis according to claim 1, wherein at least one of the plurality of optical couplers is operable to input a single one of the plurality of continuous wave optical beams of the same power and output a plurality of continuous wave optical beams at a lower power than input.

3. The chassis according to claim 1, wherein at least one of the plurality of optical couplers is operable to input at least two of the plurality of continuous wave optical beams of the same power and output the same number of continuous wave optical beams as input at the same power as input, or fewer continuous wave optical beams as input at a lower power than input.

4. The chassis according to claim 1, wherein the plurality of optical couplers comprise a plurality of Mach-Zehnder interferometers.

5. The chassis according to claim 1, wherein the plurality of optical couplers comprise at least one of a plurality of directional couplers and a plurality of multi-mode interference couplers.

6. The chassis according to claim 1, wherein at least one of the optical couplers comprises a plurality of waveguides.

7. The chassis according to claim 6, wherein at least one of a refractive index of the waveguides, a coupling length of adjacent ones of the waveguides and a coupling gap between adjacent ones of the waveguides is modifiable so that a power coupling ratio between outputs of the at least one optical coupler can be changed.

8. The chassis according to claim 7, wherein at least one of the refractive index, the coupling length and the coupling gap is modifiable by heating the at least one optical coupler.

9. The chassis according to claim 7, wherein at least one of the refractive index, the coupling length and the coupling gap is modifiable by applying a bias current to one or more electrically conductive sections of the at least one optical coupler.

10. The chassis according to claim 7, wherein the coupling gap is modifiable by an actuator included in the at least one optical coupler.

11. The chassis according to claim 6, wherein the plurality of waveguides are disposed on a semiconductor substrate.

12. The chassis according to claim 1, wherein at least one of the plurality of optical assemblies comprises a plurality of optical modules disposed on a card, and wherein one of the optical modules is operable to modulate a lower power one of the plurality of continuous wave optical beams of different powers into one of the modulated optical signals at the same power and couple that modulated optical signal onto a waveguide connecting the optical module to another one of the optical modules on the same card.

13. The chassis according to claim 1, wherein at least one of the plurality of optical assemblies comprises a plurality of optical modules disposed on a card, and wherein one of the optical modules is operable to modulate a higher power one of the plurality of continuous wave optical beams of different powers into one of the modulated optical signals at the same power and couple that modulated optical signal onto an external optical fiber connected to the card.

14. A method of optical communication via a chassis including a plurality of continuous wave lasers, a plurality of optical couplers, and a plurality of optical assemblies, the method comprising:
   generating a plurality of continuous wave optical beams at the same power via the continuous wave lasers;
   generating a plurality of continuous wave optical beams at different powers from the continuous wave optical beams of the same power via the optical couplers;
   modulating the continuous wave optical beams of different powers into a plurality of modulated optical signals at different powers via the optical assemblies; and
   coupling the modulated optical signals onto different length optical mediums via the optical assemblies so that lower power ones of the modulated optical signals are coupled to shorter ones of the optical mediums and higher power ones of the modulated optical signals are coupled to longer ones of the optical mediums.

15. The method according to claim 14, comprising:
   inputting a single one of the plurality of continuous wave optical beams of the same power into one of the optical couplers; and outputting from the optical coupler a plurality of continuous wave optical beams at a lower power than input.

16. The method according to claim 14, comprising:
inputting at least two of the plurality of continuous wave optical beams of the same power into one of the optical couplers; and
outputting from the optical coupler the same number of continuous wave optical beams as input at the same power as input, or fewer continuous wave optical beams as input at a lower power than input.

17. The method according to claim 14, wherein at least one of the optical couplers comprises a plurality of waveguides.

18. The method according to claim 17, further comprising modifying at least one of a refractive index of the waveguides, a coupling length of adjacent ones of the waveguides and a coupling gap between adjacent ones of the waveguides to change a power coupling ratio between outputs of the at least one optical coupler.

19. The method according to claim 18, comprising heating the at least one optical coupler to modify at least one of the refractive index, the coupling length and the coupling gap.

20. The method according to claim 18, comprising applying a bias current to one or more electrically conductive sections of the at least one optical coupler to modify at least one of the refractive index, the coupling length and the coupling gap.

21. The method according to claim 18, comprising operating an actuator included in the at least one optical coupler to modify the coupling gap.

* * * * *

UNITED STATES PATENT AND TRADEMARK OFFICE
CERTIFICATE OF CORRECTION

PATENT NO. : 8,798,472 B2  
APPLICATION NO. : 13/545193  
DATED : August 5, 2014  
INVENTOR(S) : Xu et al.

Page 1 of 1

It is certified that error appears in the above-identified patent and that said Letters Patent is hereby corrected as shown below:

Drawings

In Fig. 1, Sheet 1 of 6, for Tag "106", in Line 2, delete "Irontplate" and insert -- frontplate --, therefor.

Specification

In Column 6, Line 48, delete "g+/-g" and insert -- g+/-$\Delta$g --, therefor.

Signed and Sealed this
Second Day of August, 2016

Michelle K. Lee
*Director of the United States Patent and Trademark Office*